Aug. 26, 1924.
R. E. HOKE
1,506,426
TYPEWRITER KEYBOARD ARRANGEMENT
Filed June 16, 1922
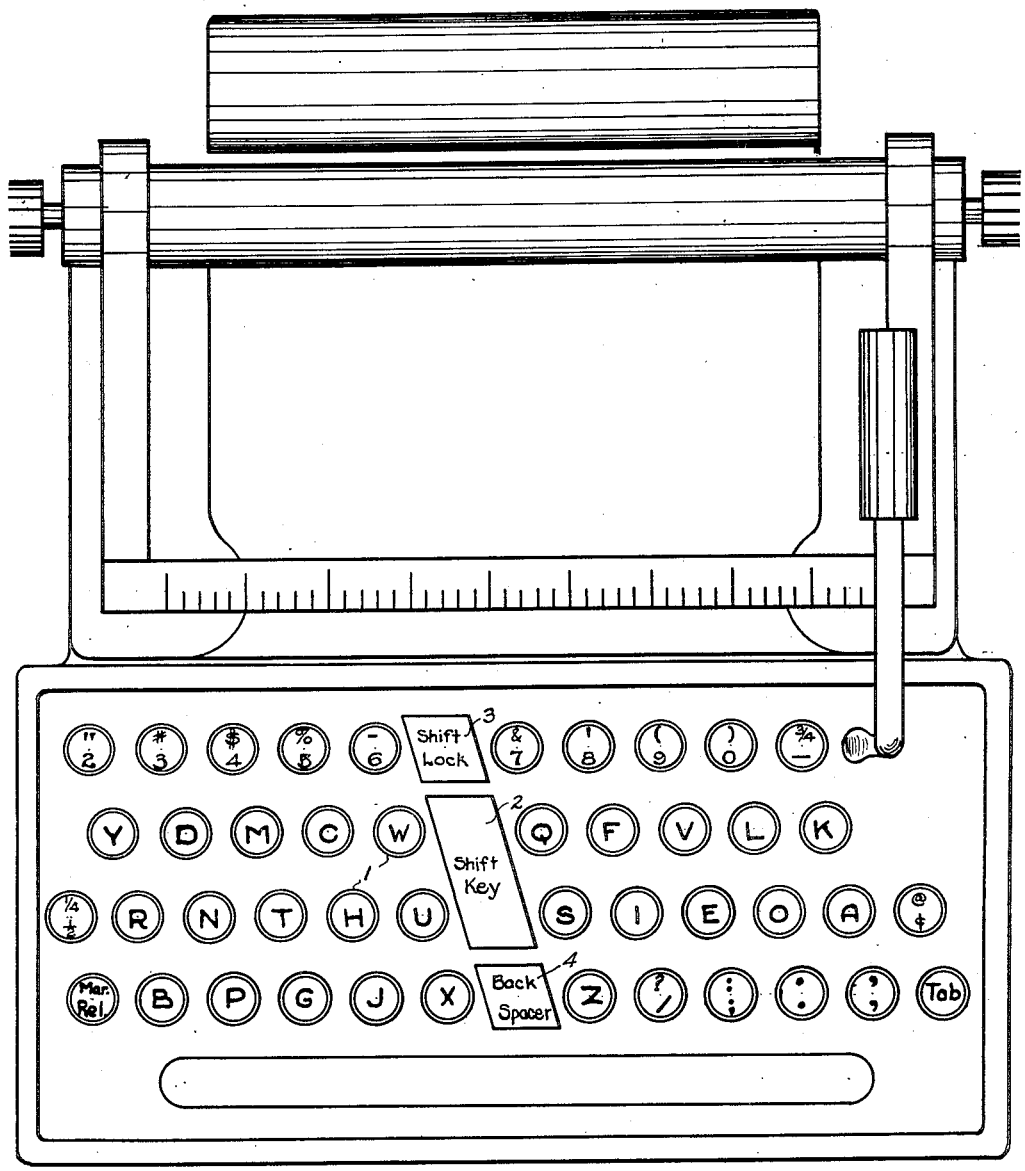
Inventor
Roy E. Hoke.
By
Attorney Patented Aug. 26, 1924.

1,506,426

UNITED STATES PATENT OFFICE.

ROY E. HOKE, OF BIRMINGHAM, ALABAMA.

TYPEWRITER-KEYBOARD ARRANGEMENT.

Application filed June 16, 1922. Serial No. 568,792.

*To all whom it may concern:*

Be it known that I, ROY E. HOKE, a citizen of the United States of America, residing at Birmingham, in the county of Jefferson and State of Alabama, have invented certain new and useful Improvements in a Typewriter-Keyboard Arrangement, of which the following is a specification.

My invention relates to improvements in the arrangement of the keys of a typewriter keyboard, and also to an improved method for the scientific distribution of the letters and symbols over the keyboard with the object of so disposing same that the maximum efficiency may be obtained in the manipulation of the keyboard.

My invention relates more particularly to the standard typewriter and my improvements in the art of scientifically distributing the letters and symbols over the keyboard are based primarily on the following considerations:—

First, since typewriting is a matter entirely of the use of the letters of the alphabet and the various marks, it is necessary to ascertain the frequency of the occurrence of these letters and marks in the English language, and to base the distribution primarily on the conclusions reached.

Secondly, since accuracy is one of the primary requisites of good typewriting, it is important to investigate the number and distribution of errors made in actual typewriting, and to learn, if possible, their causes, in order that their correction and elimination may, as far as possible, be attained by the keyboard arrangement selected.

Third, the modern "touch" method of typewriting presumably makes equal demands upon all the fingers and upon the two hands, whereas, in fact, the present standard typewriter keyboard is so arranged as to assign fifteen letters to the left hand, and only eleven to the right, and this raises the question, what are the relative abilities of the eight fingers and of the two hands, and the conclusions reached should further control the relative arrangement of the letters and marks into groups appropriate for the loads or burdens of work for which each finger and each hand has capacity.

Fourth, in connection with the consideration of the foregoing scientific principles covering the arrangement of the letters and symbols of the keyboard, I have conceived that if the keys are disposed in diagonal rows and grouped into right and left hand banks separated by the shift key, back spacer and shift lock interposed in a diagonal row between the banks, the most convenient arrangement results both for manipulation by either hand of the important spacer and shift keys with the least possible movement of such hand from its normal operating position, and for definitely assigning a bank to each hand and confining it to its respective bank.

*I. The frequency of the occurrence of letters and marks in the English language.*

The first objective to the problem under consideration is to determine the frequency with which the various letters of the alphabet and the more common marks are used in the English language. For this purpose valuable material was readily at hand as to the letters in the form of the Ayres' spelling scale. This scale itself informs us that the 1000 words in the list are "the product of combining different studies with the object of identifying the 1000 commonest words in English writing," and the 1000 words selected are those that were found most frequently in approximately 368,000 words of personal letters, business letters, newspapers, the Bible, and various English authors.

Accepting this list of 1000 words as the most common in the English language, it would appear that by counting the frequency with which the various letters of the alphabet appear in these words, we secure a very close approximation to their frequency in the English language in general, and in the work done on typewriters in particular.

Table No. I below shows in the first column the gross number of occurrences of each letter of the alphabet in the 1000 commonest words. A total of 5433 letters were found. The average length of the words, therefore, is 5.433 letters. By multiplying the number of occurrences of each letter by 1.362 (the multiplier required to raise the frequency value of "e", shown at 734 in the tables below, to 1000) I secure the second column of the table, in which "e" is raised to 1000, and the other letters are raised proportionately. The third column shows the percentage English writing that is made up by each letter of the alphabet. The fourth column gives the frequency of the letters with reference to "q" as one. From this column it will be noted that "e" is used 245 times as often as "q".

TABLE I.—*Frequency of use of letters in the words of the Ayres' spelling scale.*

|   | Times used. | Raised to 1000. | Percentage. | Based on "Q." |
|---|---|---|---|---|
| E | 734 | 1000 | 13.51 | 245 |
| T | 440 | 609 | 8.09 | 174 |
| R | 434 | 591 | 7.98 | 145 |
| A | 419 | 571 | 7.71 | 139 |
| O | 385 | 524 | 7.08 | 128 |
| N | 373 | 508 | 6.88 | 124 |
| I | 366 | 498 | 6.73 | 122 |
| S | 308 | 420 | 5.66 | 103 |
| L | 254 | 350 | 4.67 | 85 |
| C | 219 | 298 | 4.03 | 73 |
| D | 193 | 263 | 3.51 | 64 |
| U | 171 | 233 | 3.14 | 57 |
| H | 170 | 232 | 3.12 | 56 |
| P | 161 | 219 | 2.96 | 54 |
| M | 154 | 210 | 2.81 | 51 |
| G | 114 | 155 | 2.09 | 38 |
| F | 113 | 154 | 2.07 | 37 |
| Y | 107 | 146 | 1.96 | 36 |
| B | 97 | 132 | 1.78 | 32 |
| W | 90 | 123 | 1.65 | 30 |
| V | 60 | 82 | 1.09 | 20 |
| K | 36 | 49 | .66 | 12 |
| J | 14 | 19 | .25 | 5 |
| X | 13 | 18 | .23 | 4 |
| Z | 5 | 7 | .09 | 2 |
| Q | 3 | 4 | .5 | 1 |
| Total | 5433 |  | 100 | 1790 |

Although the evidence thus secured for the frequencies of letters seemed almost conclusive, it was nevertheless thought desirable to support it, if possible by corroborative evidence from original studies. With this purpose in view, three studies were made on the frequencies of letters and also of punctuation marks in (1) the Gospel of St. Mark, (2) representative business letters, and (3) current newspaper editorials.

A comparison of the data of these three original studies with Table No. I, which gives the frequency of letters only in the Ayres' spelling scale with the letter "e" raised to 1000 for purposes of comparison, will reveal much similarity both in the order or rank of the letters and in the relative frequencies of each letter in the four studies. It may justly be said that the differences in the four studies are less noticeable than the similarities. This fact may be given more definite and exact expression statistically. Reference to Table II below will show that the frequencies of letters in the Ayres' scale correlate with the frequencies found by averaging the three original studies almost perfectly. The co-efficient of correlation is .946 and the probable error is .012. The product-moment formula was used in securing this correlation in which I assume the correlation as "r" and $$r = \frac{\Sigma xy}{\sqrt{\Sigma x^2 y^2}},$$

the values of $x$ and $y$ appearing in the third and fourth columns of Table II below.

TABLE II.—*Correlation of the frequency of use of letters in the 1,000 words of the Ayres' spelling scale with their use in my three original studies.*

|   | Ayres' scale ($x$). | Average of three original studies ($y$). | Deviations of $x$. | Deviations of $y$. |
|---|---|---|---|---|
| E | 1000 | 1000 | 715 | 713 |
| T | 609 | 711 | 324 | 424 |
| A | 571 | 723 | 286 | 436 |
| O | 524 | 574 | 229 | 287 |
| S | 420 | 509 | 135 | 222 |
| I | 498 | 480 | 213 | 193 |
| N | 508 | 456 | 223 | 169 |
| R | 591 | 367 | 306 | 80 |
| H | 232 | 458 | − 53 | 171 |
| L | 350 | 349 | 65 | 62 |
| D | 263 | 261 | − 22 | − 26 |
| C | 298 | 209 | 13 | − 78 |
| U | 233 | 220 | − 52 | − 67 |
| M | 210 | 194 | − 75 | − 93 |
| Y | 146 | 185 | −139 | −102 |
| B | 132 | 170 | −153 | −117 |
| P | 219 | 138 | − 66 | −149 |
| W | 123 | 135 | −162 | −152 |
| F | 154 | 85 | −131 | −202 |
| G | 155 | 81 | −130 | −206 |
| V | 82 | 61 | −203 | −226 |
| K | 49 | 39 | −236 | −248 |
| J | 19 | 22 | −266 | −265 |
| X | 18 | 18 | −267 | −269 |
| Q | 4 | 12 | −281 | −275 |
| Z | 7 | 9 | −278 | −278 |
| Average | 285 | 287 |  |  |

It is of course possible that in any one study of the frequency of letters the chance presence or absence of a few words containing the less common letters, such as K, J, Q, X, or Z, may appreciably influence the result. This difficulty may be obviated by combining the four studies to which procedure no objection may be raised in view of the very high correlation which obtains, as set forth above.

Table III below shows the frequencies of letters and marks in the four studies made, all raised to the basis of 1000 for "e," while in the fifth column of the table we have the average of the first four. This column is based on the counting of 12,130 letters of the alphabet in connection with the four studies. It is the findings set forth in this fifth column which are accepted as a basis for evaluating the various letters and marks and their importance or frequency in my scientific method of distributing the letters and marks over the keyboard typewriter.

TABLE III.—*Studies on the frequency of use of letters and punctuation marks.*

|   | Ayres. | Mark. | Business letters. | Editorials. | Average. |
|---|---|---|---|---|---|
| E | 1000 | 1000 | 1000 | 1000 | 1000 |
| T | 609 | 605 | 686 | 841 | 685 |
| A | 571 | 572 | 720 | 876 | 684 |
| O | 524 | 325 | 711 | 685 | 561 |
| S | 420 | 340 | 463 | 723 | 486 |
| I | 498 | 321 | 446 | 673 | 484 |
| N | 508 | 391 | 557 | 420 | 469 |
| R | 591 | 247 | 386 | 468 | 423 |
| H | 232 | 565 | 411 | 409 | 402 |
| L | 350 | 232 | 420 | 396 | 349 |
| D | 263 | 340 | 274 | 169 | 261 |
| C | 298 | 85 | 265 | 276 | 231 |
| U | 233 | 137 | 260 | 263 | 223 |
| M | 210 | 151 | 214 | 216 | 198 |
| Y | 146 | 192 | 205 | 157 | 175 |
| B | 132 | 74 | 146 | 289 | 160 |
| P | 219 | 92 | 94 | 228 | 158 |
| W | 123 | 137 | 137 | 132 | 132 |
| F | 154 | 85 | 51 | 120 | 102 |
| G | 154 | 48 | 86 | 109 | 99 |
| V | 82 | 44 | 69 | 71 | 66 |
| K | 49 | 22 | 34 | 60 | 41 |
| J | 19 | 7 | 17 | 49 | 23 |
| X | 18 | 0 | 25 | 37 | 20 |
| Q | 4 | 4 | 8 | 24 | 10 |
| Z | 7 | 11 | 8 | 11 | 9 |
| . |  | 70 | 124 | 64 | 86 |
| , |  | 125 | 140 | 81 | 115 |
| : |  | 22 | 12 | 0 | 11 |
| ; |  | 41 | 0 | 7 | 16 |

TABLE IV.—*Errors made in actual typewriting as compared with frequency of occurrence of letters.*

|   | Frequency. | Errors. | Percentage. |
|---|---|---|---|
| E | 1000 | 1000 | 100. |
| T | 685 | 636 | 92.8 |
| A | 684 | 596 | 87.1 |
| O | 561 | 462 | 82.4 |
| S | 486 | 395 | 81.3 |
| I | 484 | 378 | 78.1 |
| N | 469 | 372 | 79.3 |
| R | 423 | 440 | 104. |
| H | 402 | 223 | 55.5 |
| L | 349 | 339 | 97.1 |
| D | 261 | 418 | 160.1 |
| C | 231 | 283 | 122.5 |
| U | 223 | 224 | 100. |
| M | 198 | 321 | 162.1 |
| Y | 175 | 246 | 140.6 |
| B | 150 | 97 | 60.6 |
| P | 138 | 73 | 46.2 |
| W | 132 | 84 | 63.6 |
| F | 102 | 209 | 204.9 |
| G | 88 | 325 | 328.2 |
| V | 65 | 158 | 239.4 |
| K | 41 | 96 | 234.1 |
| J | 25 | 26 | 113. |
| X | 20 | 140 | 700. |
| Q | 10 | 32 | 320. |
| Z | 9 | 20 | 222.2 |
|  | Av....287 | Av....292 | Md...108.3 |

Table II shows graphically the frequencies of the various letters. The fact is that the first six letters (E, T, A, O, S, I) are used more frequently than the remaining twenty letters. The most startling observation is the fact that "e" is used more frequently than twelve other letters combined (Y, B, P, W, F, G, V, K, J, X, Q, Z). In view of these facts the conclusion is very evident, viz, that the frequencies of the letters must be taken into consideration and form the basis for any scientific arrangement of the typewriter keyboard.

*Errors in typewriting and their causes.*

After exhaustive studies of the frequency of occurrence of errors wherein the errors were found and tabulated up to the point where "E" was charged with one thousand errors, I have in Table IV below arranged in comparative columns the frequency of occurrence of the letters and the frequency of occurrence of errors in respect of that letter and in the final column have shown the percentage relationship between the two series of data given in the "frequency" and "errors" columns. The close parallelism between "accuracy" and "frequency" may be seen from the fact that the average frequency is 287 per letter and the average errors recorded is 292 per letter, showing how closely the errors correspond to the frequency. As a result my conclusion is further confirmed that the primary factor to control the scientific distribution of the letters is their frequency, and my studies further show that the probability of error occurring more frequently in one position of the keyboard than in any other position does not enter substantially into the calculations.

I have further considered whether the errors made in typing any letter are more likely to occur in combination with any certain letter or letters than others. It does not appear from a study of this question that there is any connection between accuracy and the combination of letters with which any one letter may happen to be written. This serves only to confirm the conclusion that accuracy or inaccuracy were the results of frequent or infrequent practice, due to frequent or infrequent use of the letter.

*Relative abilities of the eight fingers and the finger and hand loads of the present typewriter keyboard.*

As a result of exhaustive tapping tests for each finger of each hand conducted with a variety of subjects, I have reached certain conclusions relative to this phase of my invention.

*III. Relative abilities of the eight fingers and the two hands for typewriting.*

For the purpose of determining the relative abilities of the eight fingers and the two hands three studies were made. The first of these studies was made upon fifty high school girls; the second on forty-six high school boys. In these two studies the following method was used. The subjects were instructed to hold the thumb of the right hand against the center of the typewriter frame, in front of the space bar, and to tap the letter "J" with the first finger on the right hand as rapidly as possible. Thirty seconds were allowed. Then with the thumb of the left hand in the same position, the subject tapped with the first finger the letter "F" for thirty seconds. Then in the same way, with the right hand second finger "K", left hand second finger "d", right hand fourth finger ";" left hand fourth finger "A", each for thirty seconds. The number of taps leaving their impressions on typewriter paper in the regular way were counted for each of the eight fingers of each of the 96 subjects.

The purpose of holding the thumb against the metal frame of the typewriter was to eliminate, as much as possible, wrist and arm movement, for it was desired to test only finger abilities. It was found that by holding the thumb in this position the subject was compelled to make the taps by relying upon the fingers alone, as was desired for the purposes of the experiment. The results of these two studies are set forth in Table V below.

An inspection of the medians in studies 1 and 2 will show that the eight fingers have about the same rank and relative ability for the two sexes.

The third study was made of forty-two college girls and twelve teachers of Frederick County, Maryland. In this study a somewhat different method was pursued. The subjects were required to tap for thirty seconds upon their desks with each finger. Particular instructions were given as to the position to be assumed: with the wrist resting upon the desk (to prevent wrist movement in tapping) and with three fingers also resting with their tips upon the desk. It was found that this position effectually prevented any wrist or arm movement being used and secured records of the tapping abilities of the fingers alone.

In inspection of the medians for the eight fingers for this third study shows that they very closely bear out the results of the first and second studies.

TABLE V.—*Tapping tests.*
TAPPING TESTS ON TYPEWRITER.

|  | Left hand. | | | | Right hand. | | | |
|---|---|---|---|---|---|---|---|---|
|  | 4 | 3 | 2 | 1 | 1 | 2 | 3 | 4 |
| Study No. 1, 50 girls: | | | | | | | | |
| Average | 103 | 116 | 113 | 115 | 118 | 126 | 126 | 119 |
| Median | 106 | 119 | 117 | 119 | 119 | 130 | 126 | 117 |
| Study No. 2, 46 boys: | | | | | | | | |
| Average | 128 | 134 | 144 | 143 | 156 | 167 | 164 | 148 |
| Median | 127 | 134 | 145 | 145 | 156 | 166 | 164 | 151 |

TAPPING TESTS ON TABLE.

|  | 4 | 3 | 2 | 1 | 1 | 2 | 3 | 4 |
|---|---|---|---|---|---|---|---|---|
| Study No. 3, 42 women: | | | | | | | | |
| Average | 106 | 99 | 121 | 143 | 161 | 134 | 101 | 115 |
| Median | 107 | 103 | 125 | 145 | 160 | 138 | 104 | 117 |

The three studies above involve a total of 190,410 taps, made by 150 different individuals. It is believed that by combining these three studies by the method of averages, we may secure conclusions as to the relative abilities of the fingers and hands which may be relied upon.

*IV. The finger and hand loads of the present typewriter keyboard.*

Since the foregoing studies make it possible to state in a mathematical form the relative abilities of the two hands and the fingers, and the relative values of each letter and mark, it would seem worth while first to raise the question, what is being expected of the fingers and hands by the present typewriter keyboard.

In accordance with the touch method, each of the eight fingers has its own proper keys, three for each finger except the first finger of each hand which has six. Table VI below gives for each finger the letters it strikes and their values, and the sum of these, which is the finger load.

These letter values are taken from Table III. Denoting the fingers of the right hand as R1, R2, R3, and R4, and those of the left hand as L1, L2, L3, and L4, we find their loads to be, in the same order: R1, 1490, R2 640, R3 296, L1, 1535, L2 1492, L3 658, L4 803. Adding these finger loads for each hand we get the hand loads: for the right hand 3422, for the left 4488. In view of the fact that in Table V we found finger abilities to be not very dissimilar, it is rather startling to find that R1, L1, and L2 are each, on the present typewriter keyboard, given more than five times as much work to do as is given to R4. In view, also, of the generally known fact that the index of right-handedness may be roughly expressed by the ration of ten to nine, that is, that the ability of the right hand is approximately one-ninth greater than that of the left, it is surprising to find that the present keyboard gives the heavier load to the weaker member.

TABLE VI.—*The typewriting load of the eight fingers and the right and left hands for present keyboard.*

RIGHT HAND.

| Fingers. | | | |
|---|---|---|---|
| 1 | 2 | 3 | 4 |
| y 175 | i 484 | o 561 | p 158 |
| h 402 | k 41 | l 349 | ; 16 |
| n 469 | 115 | 86 | : 11 |
| u 223 | | | ? 11 |
| j 23 | | | Shift 100 |
| m 198 | | | |
| 1490 | 640 | 996 | 296 |

Total for the right hand: 3422.

LEFT HAND.

| Fingers. | | | |
|---|---|---|---|
| 1 | 2 | 3 | 4 |
| r 423 | e 1000 | w 152 | q 10 |
| f 102 | d 261 | s 486 | a 684 |
| v 65 | o 231 | x 20 | z 9 |
| t 685 | | | Shift 100 |
| g 99 | | | |
| b 160 | | | |
| 1535 | 1492 | 658 | 803 |

Total for the left hand: 4488.

The question may be raised: Why are 100 strikes recorded for both the right and left hand shift key? This was gotten by actual count, 200 being recorded. However, whether the right hand strikes exactly half of them or not will vary somewhat with the nature of the matter to be written. When a letter on the left side of the present keyboard is capitalized the right shift key must be struck and vice versa. Inasmuch as most of the letters are on the left side of the keyboard and many of them the more frequent in use, it is very probable that the right shift key is the more frequently used. However, the total number will remain the same and an equal division of the total 200, while not entirely exact, is as near as can be gotten. On the revised keyboard, with its equal distribution of letters ranged according to their frequency, the number of times each shift key is struck will be more nearly equal.

The several considerations which should control a scientific rearrangement of the typewriter keyboard are the following:

1. The measured abilities of the eight fingers and of the right as compared with the left hand, should be taken into consideration, and loads assigned in proportion to strength.

2. The measured frequency of use of the letters of the alphabet and punctuation marks must be made the basis for calculating the loads to be assigned to the several fingers.

3. In addition to the above there are certain pedagogical considerations:

(a) Most used letters for home or guide keys, since on a keyboard so arranged the work could be done with the fewest possible changes of position of hands. Also the frequent use of these letters will aid the pupil in the early fixing of these home-key positions.

(b) The next most used letters should be assigned to those keys or positions which appear to be the favorable ones from the standpoint of accuracy.

(c) Since beginners find it easier to use the first fingers than the other fingers, and since the approved method of teaching typewriting, as well as other subjects, is that of proceeding from the easy to the more difficult, it is desirable to so arrange the keyboard, by assigning several of the vowels to the first fingers, that simple practice words and sentences may be written by the beginner, even in the earliest stages of the learning process.

For purposes of the first consideration, Table VII below assembles the data from Table V, i. e., the median tapping studies of the eight fingers of the three studies, combining the three by the method of averages and showing a total of finger abilities of 1046. Table VII also includes the present keyboard load from Table VI. Dividing the total keyboard load (7910) the sum of 3422 and 4488 of Table VI by the sum of the finger abilities (1046) Table V, I find that each point of finger ability must be multiplied by 7.56 so as to reapportion the whole load upon the fingers in proportion with their abilities. Comparing the ideal finger-loads with the present finger-loads, I find four over-loads of 49.3, 53, 35.8, and .5 per cent; also four under-loads, 6.1, 26.9, 41.6, and 69.4 per cent.

TABLE VII.—*Comparison of finger and hand abilities with the loads of the fingers and hands.*

|  | Left. |  |  |  | Right. |  |  |  | Total. |
|---|---|---|---|---|---|---|---|---|---|
|  | 4 | 3 | 2 | 1 | 1 | 2 | 3 | 4 |  |
| Mds. for H. S. girls | 106 | 119 | 117 | 119 | 119 | 130 | 126 | 117 |  |
| Mds. for H. S. boys | 127 | 134 | 145 | 145 | 156 | 166 | 164 | 151 |  |
| Mds. for college girls and teachers | 107 | 103 | 125 | 145 | 160 | 138 | 104 | 117 |  |
| Averages | 113 | 119 | 129 | 136 | 145 | 145 | 131 | 128 | 1046 |
| Multiplying these avs. by 7.56 to get ideal typewriting loads | 855 | 900 | 975 | 1028 | 1097 | 1096 | 991 | 968 |  |
| The loads on the present keyboard are | 803 | 658 | 1492 | 1535 | 1490 | 640 | 996 | 296 |  |
| Percentage of over- or under-load of the fingers on present typewriter keyboard |  | −26.9 6.1 |  | 49.3 53 |  | −41.6 35.8 | −69.4 .5 |  |  |

HANDS.

|  | Right. | Left. |
|---|---|---|
| Tapping ability (190,410 taps by 150 individuals) | 100,817 taps Ratio: 100 to 88.87 | 89,593 taps |
| Present load | 3422 taps Ratio: 100 to 131.25 | 4488 taps |

Per cent of over- or under-load, 47.7 (over-load of left hand.)

Of the 190,410 taps made in this study, 100,817 were made by the right hand, and 89,593 by the left in equal numbers of seconds. The ratio of the ability of the right hand to that of the left is as 100 to 88.87, or approximately as ten to nine. This agrees with the findings of Bryan. (Bryan, American Journal of Psychology, 1892, v., 123–204.) The present right and left hand loads in typewriting are 3422 taps for the right to 4488 for the left, or a ratio of 100 to 131.25. These data show an overload of the left hand of 47.7 per cent as compared with the right hand, on the present typewriter keyboard.

From the consideration of accuracy two results might follow. It might be found that for certain vertical rows of keys, or the fingers assigned thereto, there was greater accuracy, or that for certain horizontal rows there was more accuracy than for others. These two possibilities are studied in Table VIII. In the upper half of this table accuracy is compared with frequency of use for each of the horizontal rows of keys. In Table IV I show that with reference to the individual letters, accuracy and frequency of use were almost perfectly correlated. Table VIII, however, seems to show greatest accuracy in the upper horizontal line, with decreasing accuracy in the middle and especially in the lower lines, to an extent that is not justified by use or disuse. Since this is the case it will be well to assign the more frequently used letters, after the home keys have been supplied, to the upper row of keys.

The second part of Table VIII, on the other hand, shows differences in accuracy of fingers, that is, of vertical rows of keys.

TABLE VIII.—*The accuracy of horizontal lines of keys on typewriter.*

| Upper line. | | Middle line. | | Lower line. | |
|---|---|---|---|---|---|
| Rank in use. | Percentage of errors. | Rank in use. | Percentage of errors. | Rank in use. | Percentage of errors. |
| Q........ 25 | 320 | A.... 3 | 87 | Z.... 26 | 222 |
| W........ 18 | 64 | S.... 5 | 81 | X.... 24 | 700 |
| E........ 1 | 100 | D.... 11 | 160 | C.... 12 | 123 |
| R........ 8 | 104 | F.... 19 | 205 | V.... 21 | 239 |
| T........ 2 | 93 | G.... 20 | 328 | B.... 16 | 61 |
| Y........ 15 | 141 | H.... 9 | 56 | N.... 7 | 79 |
| U........ 13 | 100 | J.... 23 | 113 | M.... 14 | 162 |
| I........ 6 | 78 | K.... 22 | 234 | | |
| O........ 4 | 82 | L.... 10 | 97 | | |
| P........ 17 | 46 | | | | |
| Av... 10.9 | 112.8 | 13.6 | 151.2 | 17.1 | 226.7 |

*Comparison of the rank of the eight fingers and the hands in accuracy and in load in typewriting.*

| Fingers. | | Rank in accuracy. | Rank in load. |
|---|---|---|---|
| Right hand......... | 1 | 3 | 6 |
| | 2 | 5 | 2 |
| | 3 | 2 | 5 |
| | 4 | 1 | 1 |
| Left hand......... | 1 | 6 | 8 |
| | 2 | 4 | 7 |
| | 3 | 8 | 3 |
| | 4 | 7 | 4 |
| Right hand......... | | 108% of errors. | 3422 |
| Left hand......... | | 192% of errors. | 4488 |

The accuracy data is taken from Table IX.

TABLE IX.—*The accuracy of the eight fingers in typewriting (percentages).*

RIGHT HAND.

| Fingers. | | | |
|---|---|---|---|
| 1 | 2 | 3 | 4 |
| y............ 141 | i.... 78 | o.... 82 | p.... 46 |
| h............ 56 | k.... 234 | l.... 97 | |
| n............ 79 | | | |
| u............ 100 | | | |
| j............ 113 | | | |
| m............ 162 | | | |
| Average.... 108 | 156 | 89 | 46 |

Average for the right hand: 108.

TABLE IX.—*The accuracy of the eight fingers in typewriting (percentages)*—Continued.

LEFT HAND.

| Fingers. | | | |
|---|---|---|---|
| 1 | 2 | 3 | 4 |
| r............ 104 | e.... 100 | w.... 64 | q.... 320 |
| f............ 205 | d.... 160 | s.... 81 | a.... 87 |
| v............ 239 | c.... 123 | x.... 700 | z.... 222 |
| t............ 93 | | | |
| g............ 328 | | | |
| b............ 61 | | | |
| Average.... 172 | 128 | 282 | 210 |

Average for the left hand: 192.

But while the accuracy of fingers seems to differ, it appears from the table that this is due to the loads assigned to the fingers and hands, rather than to qualities of the fingers or hands themselves. For when the fingers are given their rank for accuracy and for load, I find a close correlation. The overloaded fingers tend to be more inaccurate. In the case of the two hands the evidence is even more clear. The right hand with small load has high accuracy. The left hand with heavy load has low accuracy score. The average frequency of use of letters written by the left hand on the present keyboard is 291, by the right 280. So far as the law of use goes, the left hand should be four per cent more accurate than the right. Instead of this I find the right hand 84% more accurate than the left. This must be due to the overload of the left hand. This evidence tends to show that nearly half of the errors made by the left hand in typewriting are preventable, due to the bad apportioning of the typewriting load in the present keyboard.

A further important reason why the typewriter keyboard should be scientifically rearranged is the self-evident fact that maximum speed and ease of operation can never be attained so long as some fingers are overworked, while others do not have a chance to contribute their full share to the total result.

A rearrangement of the keyboard will, it is clear, make for improved speed and accuracy in typewriting.

The present standard arrangement of the typewriter keyboard antedates the "touch" method of operating, which has come to be the only accepted method in the teaching of typewriting. Therefore the considerations, if any, which suggested the present arrangement of the keyboard, do not apply, but new considerations must be brought to bear which take account of the fact that all of the fingers are to be used and should contribute their share, no more and no less.

In accordance with the above considerations I offer below in Table X the preferred rearrangement of letters and marks of the typewriter keyboard, having in mind that there may be an interchange of letters having approximately similar frequency values without materially disturbing the balance of my keyboard.

TABLE X.—*Diagram III.*

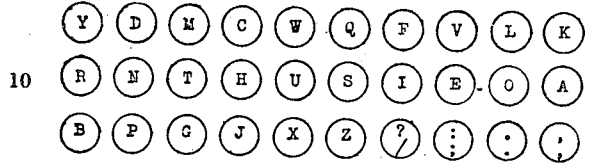

|  | Finger. | | | | | | | |
|---|---|---|---|---|---|---|---|---|
|  | L4 | L3 | L2 | L1 | R1 | R2 | R3 | R4 |
| Load on above keyboard | 858 | 888 | 982 | 1031 | 1098 | 1093 | 996 | 971 |
| Ideal load | 855 | 900 | 975 | 1028 | 1097 | 1096 | 991 | 968 |
| Load on present keyboard | 803 | 658 | 1492 | 1535 | 1490 | 640 | 996 | 296 |

The data shown below the keyboard in alignment with the rows of keys indicates the finger to which the keys above it are assigned and below the finger appear in three horizontal columns the load value of the letters assigned in the above keyboard to each finger, the ideal load to be imposed on such finger and the load imposed on such finger in the present standard keyboard. This data very vividly portrays how greatly unbalanced the finger loads on the present keyboard are and how close to ideal is the finger load distribution in my improved keyboard.

By reference to the last column of Table III showing the average frequency of use of the various letters and punctuation marks, it will be apparent within what limits there may be substitution of one letter for another without serious unbalancing of the finger loads. For instance, the letter "b" having a frequency of 160 will exchange places with the letter "p" having a frequency of 158, and in like manner the letters "a" and "t" will exchange places, the desirability of such changes being always subject to the pedagogical considerations hereinbefore set forth.

Having thus described what I consider a scientific distribution of the letters and marks on the keyboard, I now turn to a consideration of the mechanical arrangement of the keys, particularly with relation to the shift, shift-lock and back spacer keys. In considering this phase of my invention reference is made to the accompanying drawings which partially illustrate in plan view a typewriter keyboard having the arrangement of keys 1, both for letters and marks shown in Table X, and having the keys arranged in diagonal rows and further divided into right and left hand banks by the interposition of the shift key 2, shift lock key 3 and the back spacer key 4, these keys forming a diagonal row equal in length with the other diagonal rows of keys and with the shift key approximately two or three times the length of the keys 3 and 4 and interposed preferably between them where it is in most convenient position for manipulation by the fore finger of either hand. This arrangement has several very marked advantages which are; the shift key is brought into a central position where it can be operated without the movement of the hand which is required where the key is set as on the present keyboard; the shift key and the back spacer are in like manner brought into a central and convenient position for operation by the fore finger of each hand; the shift lock is brought into alignment with the shift key, and the three keys, 2, 3 and 4, form a very definite division or separation of the right and left hand banks of keys, thereby tending to avoid errors and undesirable hand movement resulting from encroachment of one hand on the territory of another; and finally the interposed keys 2, 3 and 4 very definitely accentuate the importance and make necessary the confining of each hand to its appropriate bank of keys with a minimum of hand movement for complete performance of the entire duty assigned it.

It is to be understood that the drawing is a conventional showing only, all typewriter details being formally shown.

Having thus described my invention, what I claim as new and desire to secure by Letters Patent, is:—

1. A typewriter keyboard having the printing keys arranged in parallel diagonal rows from front to back and interposing between the center rows a diagonal row of machine control keys lying in the same level with the other keys and forming a row parallel therewith.

2. A typewriter keyboard in accordance with claim 1, in which the machine control keys form a row spaced on equal centers with the other rows and comprise respectively a shift, shift lock and back set key.

In testimony whereof I affix my signature.

ROY E. HOKE.

Witness:
NOMIE WELSH.